INVENTORS
Harold O. McBride
Oscar A. W. Tichy
Howard G. McNish

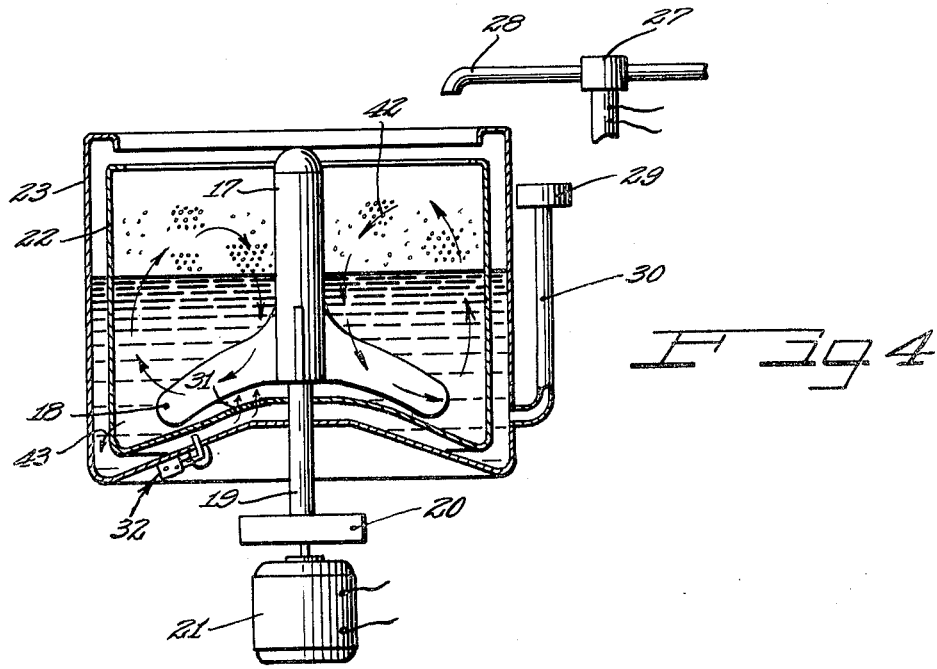
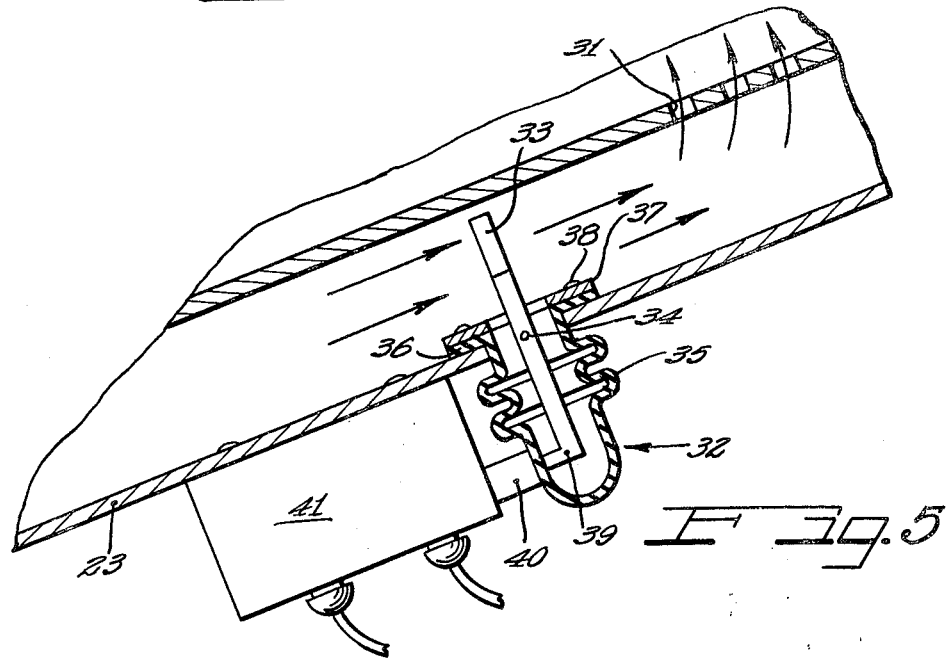

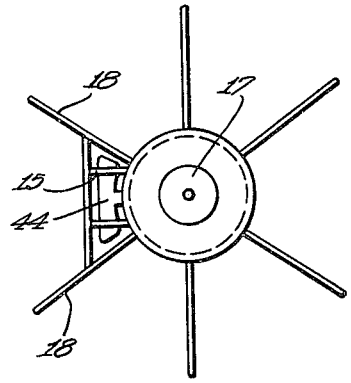
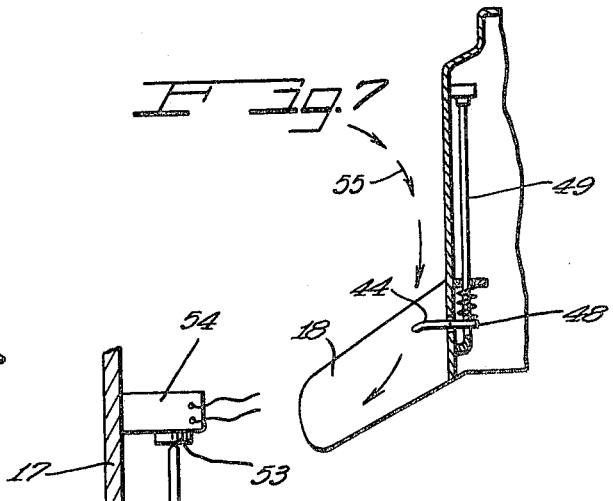
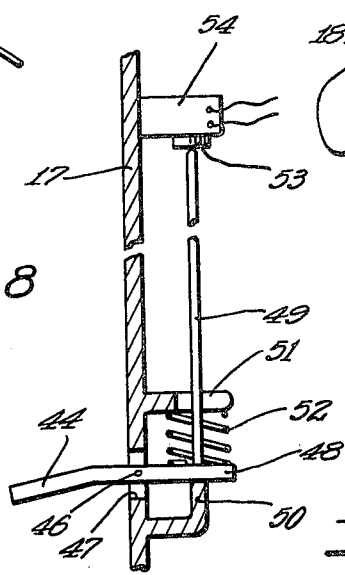
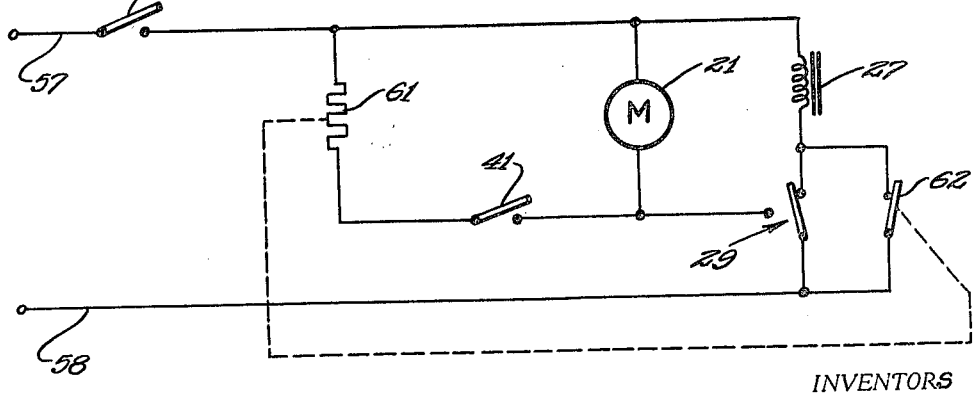

United States Patent Office 3,478,373
Patented Nov. 18, 1969

3,478,373
FLOW RESPONSIVE AUTOMATIC WATER LEVEL CONTROL
Harold O. McBride and Oscar A. W. Tichy, St. Joseph, and Howard G. McNish, Stevensville, Mich., assignors to Whirlpool Corporation, Benton Harbor, Mich., a corporation of Delaware
Filed Mar. 28, 1968, Ser. No. 714,580
Int. Cl. D06f *33/02;* F16k *21/18*
U.S. Cl. 8—158                           12 Claims

ABSTRACT OF THE DISCLOSURE

Method and apparatus for controlling the liquid level in a washing machine, employing a sensing means which is positioned along a predetermined liquid flow path to sense the presence of a predetermined flow pattern in the liquid, whereupon the sensing means operates circuitry to terminate the introduction of water into the machine.

BACKGROUND OF THE INVENTION

Field of the invention

This invention is in the field of washing machines with an automatic control of the liquid level, the control being effected by sensing the movement of the liquid paths in the machine which in turn are related to the number of times the articles being washed are rolled over per unit of time.

DESCRIPTION OF THE PRIOR ART

Few automatic washing machines rely on the sensing of conditions occurring during the washing cycle as a means for controlling introduction of water into the tub. Among the few that do are the systems shown in U.S. Patents Nos. 3,030,790; 3,065,618; and 3,093,841, all owned by the assignee of the present application. These patents, however, deal with systems which add the proper amount of water to the tub in response to sensing the torque transmitted by the clothing load from the oscillating agitator to the tub or the machine.

SUMMARY OF THE INVENTION

The present invention provides a water level control which provides the correct amount of water to a load regardless of the type of fabric being laundered or the load size. Accordingly, optimum washing action is insured. Agitation of clothing in too little water may cause damage to fabrics, whereas agitation of fabrics in too much water does not allow proper washing action of the fabrics by the agitator to occur. Furthermore, with the system of the present invention, hot water is preserved because the tub is filled only with enough water to launder the clothing, thus saving in both water consumption and fuel costs. The reduction of the amount of water also effects a saving in the amount of laundering detergent used.

This invention is based, in part, upon the discovery that proper washing action in a washing machine employing an oscillating agitator is evidenced by a characteristic flow pattern in the washing liquid circulating through the machine. We have found that for most efficient washing action, the fabrics being washed should "roll-over" a certain predetermined number of times per minute, the precise number depending upon the size and geometry of the fabric. With the system of the present invention, the sensing element is provided in the predetermined flow path known to provide the proper number of roll-overs during the washing cycle. When the proper flow pattern is established for the washing liquid, the sensing means operates to terminate introduction of water into the tub, so that the desired flow pattern is maintained in the tub for the rest of the washing cycle.

BRIEF DESCRIPTION OF THE DRAWING

FIGURE 4 is a view similar to FIGURES 2 and 3 but illustrating the improvements of the present invention;

FIGURE 5 is a fragmentary enlarged view of the sensing means as shown in FIGURE 4;

FIGURE 6 is a plan view of an agitator employing a modified type of sensing device;

FIGURE 7 is a view partly in elevation and partly in cross-section of the device of FIGURE 6;

FIGURE 8 is a fragmentary view, partly in cross-section, on an enlarged scale showing the sensing means of FIGURES 6 and 7; and FIGURE 9 is a wiring diagram of a circuit which may be employed for the purposes of the present invention.

DESCRIPTION OF THE PREFERRED EMBODIMENTS

Figure 1:
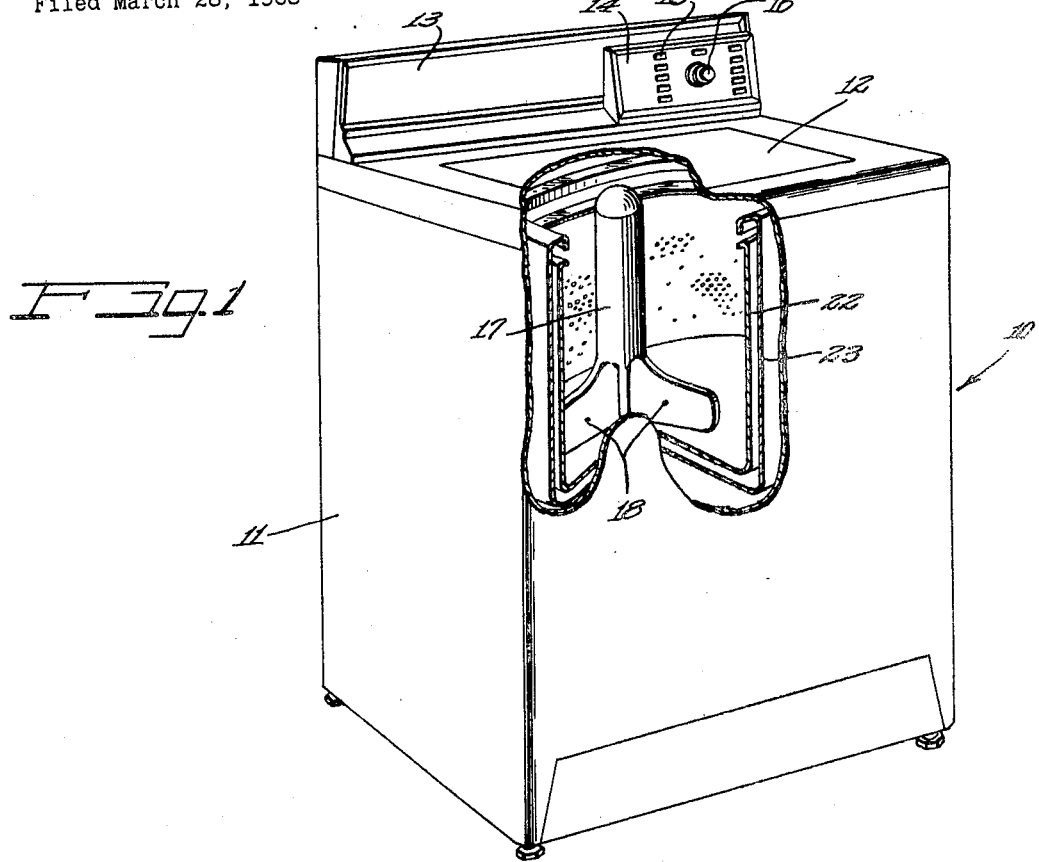
FIGURE 1 is a view partly in perspective and partly broken away of a washing machine embodying the improvements of the present invention.

In FIGURE 1, reference numeral 10 indicates generally an automatic washing machine of the type which can be used in accordance with the present invention. The washing machine 10 may include a cabinet 11 having a lid 12 for introducing articles to be washed into the machine. The cabinet 11 has a back 13 which includes a control panel 14 and a push button 15 as well as a control knob 16 for selecting operating conditions and intervals depending on the type of fabrics being laundered.

Centrally of the washing machine there is disposed an oscillating agitator 17 having a plurality of radially extending vanes 18. The agitator 17 is oscillated by means of a shaft 19 (FIGURE 4) which is connected to a transmission 20, which, in turn, is driven by a motor 21.

The agitator 17 is disposed within a basket 22 which is contained within a tub 23. As best illustrated in FIGURES 2 and 3, the basket 22 has a bottom wall 24 which extends in generally parallel relationship to the curvature of the bottom of the agitator vanes 18.

Figure 3:
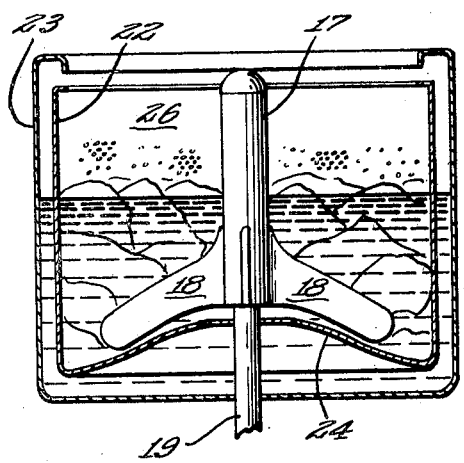
FIGURE 3 is a view similar to FIGURE 2 but illustrates the disruption in the flow pattern which occurs because of the presence of fabrics in the machine.
Figure 2:
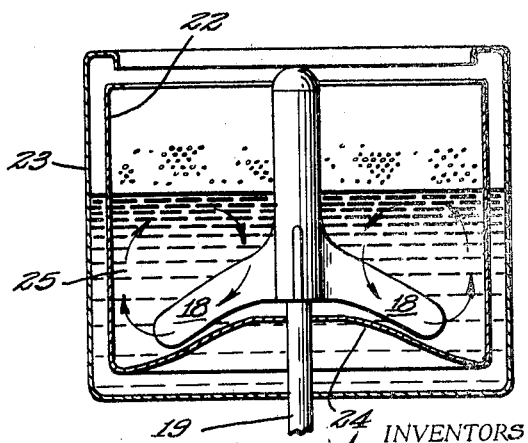
FIGURE 2 is a somewhat schematic view illustrating the water flow paths which exist in the machine due to the action of the agitators when no laundry is present in the machine.

Referring now to FIGURES 2 and 3, with the agitator 17 being oscillated, the vanes 18 act as the impellers of a pump located in the bottom of the basket 22. If no clothing is present in the basket 22, water is pumped in the general direction indicated by the arrows 25 in FIGURE 2. When, however, a large load of clothing 26 is introduced into the tub 22, as illustrated in FIGURE 3, oscillation of the agitator 17 can no longer establish flow currents of the type shown in FIGURE 2. This is because the clothing 26 effectively blocks the flow patterns in the water which the agitator is attempting to generate as it oscillates. If sufficient water were present to launder the clothing 26 properly, the entire load would follow a path as indicated by the arrows 25 of FIGURE 2. This movement would cause the clothing 26 to continuously "roll-over" as the agitator 17 oscillates, and this "roll-over" has been found to be a highly critical factor with regard to proper washing action. It has been found, for example, that there is a direct relationship between the number of "roll-overs" per minute and the washing capability of the machine.

In accordance with the present invention, the flow patterns of the washing liquid in the tub 22 are sensed, and water introduced to the machine is terminated when the proper flow patterns are achieved.

In the system shown in FIGURE 4, there is provided an electrically actuated valve 27 controlling liquid flow through an inlet conduit 28 which discharges into the laundry machine. To sense the water level within the tub 23, there is provided a pressure switch 29 mounted on a tube 30 communicating with the lower portion of the tub 23. The basket 22 is provided with apertures 31 near the agitator to provide for circulation of the washing liquid in the proper flow pattern. It has been observed that when the proper water level for washing is reached, the clothes and water rotate about a horizontal axis, moving downward of the agitator, outward along the bottom of the basket, and upward at the wall of the basket, as illustrated by the arrows of FIGURE 4. In order to sense the presence of this type of flow pattern, there is provided a sensing means generally indicated at numeral 32 in FIGURE 4, and illustrated more completely in the enlarged view of FIGURE 5.

Then sensing means 32 may include a paddle 33 which is pivoted on a pin 34. The lower portion of the paddle 33 extends below the bottom of the tub 23 and is enclosed in a water-tight boot 35. A gasket portion 36 of the boot 35 is held against the bottom of the tub 23 by means of a ring 37 and rivets 38. Thus, a water-tight seal is established to prevent leakage of water from the tub.

The upper end of the paddle 33 is positioned so that it is substantially normal to the direction of the predominating currents of water flow when the water is circulating in the desired pattern as indicated by the arrows in FIGURE 5. When the velocity head of the water is sufficient to pivot the paddle 33 about the pin 34, the lower portion 39 of the paddle assembly presses an actuator button 40 of a microswitch assembly 41 which is secured to the bottom of the tub 23.

Returning now to FIGURE 4, the general operation of the water level control device will now be described. Clothing is first added to the basket 22, whereupon the conduit 28 admits water to the tub. At about a level of 8 inches of water, the pressure switch 29 deenergizes the valve 27 and energizes the motor 21. If sufficient water is present for the clothing load being laundered, water currents are established as indicated by the arrows 42 in FIGURE 4. Thus, water is pumped outwardly through the perforate side wall of the basket 22 as indicated by arrow 43 and travels beneath the basket 22 on the lower wall of the tub 23 and back into the basket 22 through the apertures 31. When this normal flow pattern is established, there will be a force on the paddle 33 sufficient to pivot the paddle about the pin 34 and to press the energizing button 40 of the switch 41. This terminates any further addition of water to the machine through the conduit 28 controlled by the valve 27. However, if there is insufficient water present in the tub to allow the agitator 17 to establish this type of flow pattern, additional water will be introduced until such time as the flow pattern indicated by the arrows in FIGURES 4 and 5 is established and the switch 41 is actuated.

A modified form of the sensing apparatus is illustrated in FIGURES 6 through 8 of the drawings. In this form of the invention, the sensing means is positioned in close proximity to the agitator 17 and is operated by the water currents running substantially parallel to the agitator axis during agitation. As shown in FIGURE 4, as the water is being pumped in a toroidal fashion by the agitator 17, it returns along the agitator barrel before being thrown outwardly by the vanes 18. Accordingly, a paddle 44 is provided which extends into the interior of the agitator as shown in FIGURE 8. A shield 45 is provided between adjoining vanes 18 about the paddle 44 to prevent clothing from engaging the paddle 44.

As best seen in FIGURE 8, the paddle 44 is pivoted on a horizontal axis by means of a pin 46 extending across an opening 47 provided in the agitator column. The paddle 44 has an end portion 48 which engages a vertically disposed rod 49. A protrusion 50 is formed on the interior of the agitator column to limit the amount of pivotal movement which the paddle 44 can undergo. Another projection 51 is provided inwardly of the agitator column to serve as a guide for the sliding movement of the rod 49. A spring 52 is compressed between the protrusion 51 and the end 48 of the paddle 44 to keep the paddle biased away from a position where the rod 49 operates the actuating button 53 of a microswitch 54. The microswitch 54 is positioned above the maximum water line which exists in the tub 23.

Water following the path indicated by the arrows 55 in FIGURE 7 exerts downward pressure on the paddle 44. If the proper amount of water is present with sufficient velocity, the paddle 44 is pivoted about the pin 46 and pushes rod 49 upwardly. This actuates the switch 54 and through circuitry, hereinafter to be described, terminates introduction of water into the laundry machine.

Either type of sensing element described in the foregoing figures can be used in the circuitry of FIGURE 9. Power for energizing the circuit comes from the power lines 57 and 58 and is under the control of a timer operated switch 59. The pressure switch 29 is a single pole, double throw switch. One contact of the switch 29 is connected in series with the electrically operated valve 27. Thus, with the pressure switch 29 being in the position shown in FIGURE 9, immediately upon closing of the timer operated switch 59, the electrically controlled valve 27 is energized and the conduit 28 delivers water into the laundry machine.

When the level of the water in the tub has reached approximately 8 inches, as sensed by the pressure sensitive switch 29, the arm on the switch 29 moves to the other contact, thereby deenergizing the electrically operated valve 27 and energizes the motor 21. The agitator 17 thereby commences operation. Transfer of the switch arm to the second contact also energizes a resistance heater 61 to the sensing microswitch 41. When power is supplied to the heater 61 for a sufficiently long period of time, it closes a bimetallic switch 62, thereby reenergizing the electrically operated valve 27. However, if sufficient water currents are present, the paddle 33 will be pivoted sufficiently to open the microswitch 41. Consequently, the heater 61 is not energized and switch 62 remains open.

If the clothing load is too great for the amount of laundry liquid in the tub, the flow of fluid is blocked within the tub. Microswitch 41 then remains closed causing the heater 61 to energize bimetallic switch 62. Water is then added to the tub through the electrically controlled valve 27. When sufficient water has been added to establish the proper flow pattern, microswitch 41 is opened by the sensing mechanism and the heater 61 is not energized. This results in opening of switch 62 and further additions of water are thereby terminated.

From the foregoing, it will be seen that the system of the present invention provides a convenient means for providing an optimum amount of water in the tub or washing machine, thereby increasing washing efficiency and reducing the amount of water employed, especially the amount of hot water.

It should also be evident that various modifications can be made to the described embodiments without departing from the scope of the present invention.

The embodiments of the invention in which an exclusive property or privilege is claimed are defined as follows:

1. The method of controlling the liquid level in a washing machine having an oscillating agitator therein which comprises positioning a sensing means within said machine along a predetermined liquid flow path known to be efficient for the proper washing of fabrics therein, sensing deviations from said liquid flow path with said sensing means, and controlling introduction of water into said machine in response to such sensing.

2. The method of claim 1 in which said flow path is one which involves a predetermined number of fabric roll-overs per unit of time.

3. A washing machine comprising a tub, an oscillatory agitator disposed within said tub, liquid inlet means for introducing water into said tub, a sensing means disposed in the path of circulating liquid in said tub, said sensing means being movable in response to the circulation of liquid in said tub from a first position in which said sensing means controls said liquid inlet means to introduce water into said tub, and a second position occurring when the flow of liquid into the tub achieves a predetermined pattern, and circuit means turning off said liquid inlet means when said sensing means is in said second position.

4. A washing machine comprising a tub, an oscillatory agitator disposed within said tub, liquid inlet means for introducing water into said tub, sensing means for sensing the flow pattern of liquid in said tub as a function of the number of roll-overs the articles being washed undergo in a predetermined unit of time, and circuit means actuated by said sensing means and arranged to terminate introduction of water from said liquid inlet means when said number of roll-overs per unit of time reaches a predetermined value.

5. The machine of claim 4 in which said sensing means is positioned along the base of said tub.

6. The machine of claim 4 in which said sensing means is positioned along said oscillatory agitator.

7. The machine of claim 4 in which said sensing means includes a pivotal arm disposed in the path of fluid flow and a switch actuated by said arm to shut off said liquid inlet means upon sufficient pivotal movement of said arm.

8. The machine of claim 4 in which said sensing means includes a paddle disposed between the vanes of said agitator, said paddle being mounted for pivotal movement about a horizontal axis.

9. The machine of claim 8 which also includes a switch means mounted interiorly of said agitator and being actuated by pivotal movement of said paddle.

10. The machine of claim 9 which includes spring means biasing said paddle away from its switch actuating position.

11. The method of controlling the level of liquid in a washing machine which includes the steps of successively adding liquid to a confined pool and thereby raising the level of the liquid in the pool, while so adding liquid agitating the pool of liquid to establish a circulatory pattern of current flow within the pool, at one point in the pool sensing the current flow to determine changes occurring therein as a function of the changing water level, and terminating the addition of liquid upon sensing an optimum current flow.

12. A washing machine comprising means for confining a pool of liquid in a washing zone, agitating means in the pool for establishing a circulatory pattern of current flow in the pool, sensing means at a selected point in the pool for sensing changes in current flow occurring as a function of the changing water level, and control means regulated by said sensing means for terminating the addition of liquid to the pool when current flow is optimum.

References Cited
UNITED STATES PATENTS

| | | | |
|---|---|---|---|
| 3,086,836 | 4/1963 | Ohmann | 8—158 |
| 3,093,841 | 6/1963 | Cobb et al. | 8—158 |
| 3,316,569 | 5/1967 | Brenner et al. | 8—158 |

WILLIAM I. PRICE, Primary Examiner

U.S. Cl. X.R.

68—12, 207; 137—387